United States Patent
Lawrence et al.

(10) Patent No.: US 12,467,756 B2
(45) Date of Patent: Nov. 11, 2025

(54) DRIVER SCORING SYSTEM AND METHOD WITH DRIVING EVENT CONTEXT NORMALIZATION USING ROAD QUALITY INFORMATION

(71) Applicant: Intel Corporation, Santa Clara, CA (US)

(72) Inventors: Sean J. Lawrence, Bangalore Ka (IN); Subramanian C, Bangalore (IN); Rajeev Rajasekharan, Bangalore (IN); Balachandar Santhanam, Bangalore Ka (IN)

(73) Assignee: Intel Corporation, Santa Clara, CA (US)

( * ) Notice: Subject to any disclaimer, the term of this patent is extended or adjusted under 35 U.S.C. 154(b) by 909 days.

(21) Appl. No.: 17/478,139

(22) Filed: Sep. 17, 2021

(65) Prior Publication Data

US 2022/0003556 A1   Jan. 6, 2022

(51) Int. Cl.
| | |
|---|---|
| *B60W 40/06* | (2012.01) |
| *B60W 40/09* | (2012.01) |
| *B60W 40/10* | (2012.01) |
| *G01C 21/28* | (2006.01) |
| *B60W 40/08* | (2012.01) |

(52) U.S. Cl.
CPC ............ *G01C 21/28* (2013.01); *B60W 40/06* (2013.01); *B60W 40/09* (2013.01); *B60W 40/10* (2013.01); *B60W 2040/0818* (2013.01); *B60W 2540/229* (2020.02)

(58) Field of Classification Search
CPC ........... B60W 30/18109; B60W 40/06; B60W 40/09; B60W 40/10; B60W 60/001; B60W 2040/0818; B60W 2420/403; B60W 2540/229; B60W 2552/05; B60W 2552/35; B60W 2552/53; B60W 2554/4041; B60W 2554/801; B60W 2556/40; B60W 2556/45; B60W 2556/50; G01C 21/28; G01C 21/3476; G01C 21/3602; G01C 21/3896
See application file for complete search history.

(56) References Cited

U.S. PATENT DOCUMENTS

| | | | |
|---|---|---|---|
| 2016/0086285 A1* | 3/2016 | Jordan Peters | .. G08G 1/096827 701/484 |
| 2016/0183068 A1* | 6/2016 | Shen | ...................... G06Q 10/04 455/466 |
| 2016/0195406 A1* | 7/2016 | Miles | ................. G06Q 10/0639 701/537 |
| 2016/0214571 A1* | 7/2016 | Othmer | ................... B60R 25/01 |

(Continued)

OTHER PUBLICATIONS

Lexus—Driver Score Feature; prior to Jan. 6, 2021; https://lexus2.custhelp.com/app/answers/detail/a_id/10453/~/driver-score-feature#:~:text=The%20trip%20score%20is%20calculated,will%20appear%20the%20following%20day.&text=The%20overall%20driver%20score%20is,over%20the%20past%2030%20days.

(Continued)

*Primary Examiner* — Peter D Nolan
*Assistant Examiner* — Ce Li Li
(74) *Attorney, Agent, or Firm* — Banner & Witcoff Ltd.

(57) ABSTRACT

Techniques are disclosed to determine driver scoring that consider road quality and/or conditions in driver score computations. In contrast to the conventional approaches, the use of road conditions and/or road quality in the computation of driver scores allows for the consideration of road conditions and/or quality to improve upon conventional scoring techniques.

21 Claims, 10 Drawing Sheets

(56) References Cited

U.S. PATENT DOCUMENTS

| | | | | |
|---|---|---|---|---|
| 2017/0021764 A1* | 1/2017 | Adams | ............ | G06Q 40/08 |
| 2021/0166323 A1* | 6/2021 | Fields | ............ | G08G 1/096758 |
| 2022/0034678 A1* | 2/2022 | Chintakindi | ....... | G01C 21/3484 |
| 2022/0082395 A1* | 3/2022 | Sasaki | ............ | H04W 4/46 |
| 2022/0315014 A1* | 10/2022 | Fields | ............ | G06Q 40/08 |
| 2024/0290146 A1* | 8/2024 | Brinkmann | ............ | G07C 5/008 |

OTHER PUBLICATIONS

Sentiance—"Each use case needs its own solution: how Sentiance delivers tailored driving scores," Mar. 29, 2019; https://www.sentiance.com/2019/03/29/driving-score/.

Wikipedia—Collision Avoidance System; Dec. 10, 2020; https://en.wikipedia.org/wiki/Collision_avoidance_system.

Rob Matheson, Massachusetts Institute of Technology, "PhysApp that rates drivers' behavior yields promising safety results on the road," Jan. 6, 2016; https://phys.org/news/2016-01-app-drivers-behavior-yields-safety.html#google_vignette.

* cited by examiner

DRIVER SCORING SYSTEM AND METHOD WITH DRIVING EVENT CONTEXT NORMALIZATION USING ROAD QUALITY INFORMATION

TECHNICAL FIELD

The disclosure described herein generally relates to driving scoring systems and methods for vehicles, including systems and methods configured to determine driver scores based on road quality information.

BACKGROUND

Vehicle driver score algorithms may utilize data produced by driver behavior and events generated by the vehicle to determine a driver score. So called "smart" vehicles, which may include artificial intelligence and/or advanced driving assistance (ADAS) systems, may compute driver scores and use the computed scores for individual vehicles and fleets of vehicles (e.g. monitored by a Fleet Management Systems (FMS)) to provide insights into potential improvements and possible interventions to improve driving quality of the drivers. Conventional driver scoring techniques may utilize data produced by driver behavior and events generated by the vehicle. However, current driver scoring techniques have various drawbacks.

BRIEF DESCRIPTION OF THE DRAWINGS/FIGURES

The accompanying drawings, which are incorporated herein and form a part of the specification, illustrate the present disclosure and, together with the description, further serve to explain the principles and to enable a person skilled in the pertinent art to make and use the techniques discussed herein.

In the drawings, like reference characters generally refer to the same parts throughout the different views. The drawings are not necessarily to scale, emphasis instead generally being placed upon illustrating the principles of the disclosure. In the following description, reference is made to the following drawings, in which.

The present disclosure will be described with reference to the accompanying drawings. The drawing in which an element first appears is typically indicated by the leftmost digit(s) in the corresponding reference number.

DETAILED DESCRIPTION

Figure 1:
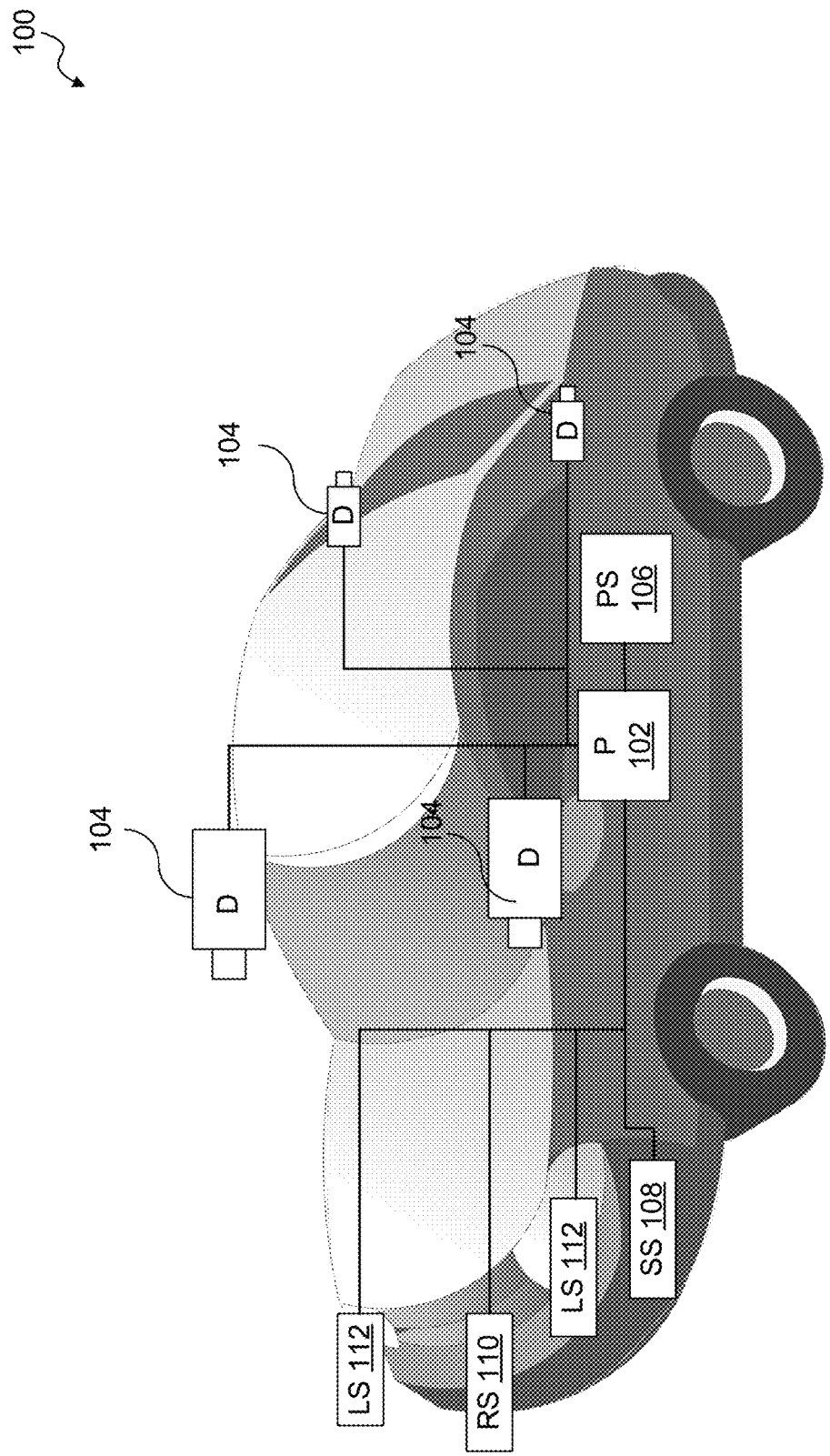
FIG. 1 illustrates a vehicle in accordance with the present disclosure.

The following detailed description refers to the accompanying drawings that show, by way of illustration, exemplary details in which the disclosure may be practiced. In the following description, numerous specific details are set forth in order to provide a thorough understanding of the present disclosure. However, it will be apparent to those skilled in the art that the various designs, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

Conventional driver scoring techniques may utilize data produced by driver behavior and events generated by the vehicle. However, these conventional techniques do not consider road conditions in driver score computations.

To address the shortcomings of conventional systems, the disclosure describes driver scoring techniques that consider road quality and/or conditions in driver score computations. In contrast to the conventional approaches described above, the use of road conditions and/or road quality in the computation of driver scores allows for vehicles and/or FMS to consider road conditions and/or quality to improve upon conventional scoring techniques. The road quality and/or conditions may vary widely due to, for example, varying construction techniques and/or materials, location, or the like, which may result in uneven surfaces, potholes, and improper designs across different roads. Further, the type of roads (e.g. paved vs. unpaved, cobblestone, brick, etc.) may also vary across localities.

The consideration of road conditions and/or quality in the computation of the driver score advantageously improves the identification of potential causes for a particular driver behavior and/or vehicle event that may affect the resulting driver score. Events may include harsh movements (such as acceleration, breaking and curving). Such harsh movements may also be referred to as harsh driving events, and may include: Harsh Acceleration (HA), Harsh Velocity (HV), Harsh Breaking (HB), Harsh Curving (HC)/directional-change, or other harsh, sudden, or drastic vehicle maneuvers.

Events may also be generated from Driver Monitoring Systems (DMS) that detect driver behavioral events, such as distracted-driver events, impaired-driver events, phone usage, smoking, and drowsiness. Additional events may include Collision Avoidance System (CAS) events, such as Forward Collision Warnings (FCW), Pedestrian Collision Warnings (PCW), Headway Monitoring Warnings (HWM) and other CAS alerts/events. The types of events are not limited hereto and may include any events that would be understood by one of ordinary skill in the art.

The vehicle or fleet of vehicles may implement a Safety Driving Model (SDM). The SDM functions to provide a mathematical framework that aims to ensure safety assurance of autonomous vehicles (AVs) and/or any suitable type of vehicle that implements at least some form of an autonomously-executed action or control without human assistance (fully-autonomous control functions, semi-autonomous control functions, etc.). Thus, the SDM is a comprehensive framework that was developed to ensure both longitudinal and lateral safety of vehicles (such as AVs) in various types of scenarios. The SDM (also referred to as a "driving policy model" or simply as a "driving model"), may be implemented as part of a fully or semi-autonomous vehicle control system, such as an advanced driving assistance (ADAS) system and/or a driving assistance and automated driving system.

A SDM may thus be represented as any suitable number of SDM parameters, any suitable subset of which being related as part of a mathematical model formalizing an interpretation of applicable laws, standards, policies, etc., which are applicable to self-driving (such as ground) vehicles and/or other suitable types of vehicles that may implement fully autonomous or semi-autonomous functions and which may utilize tools such as the aforementioned adaptive cruise control, automated braking or steering, etc. For instance, a SDM may be designed to achieve three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic, and in turn limit the scalability of system deployment; and third, the interpretation should be efficiently verifiable in the sense that it can be rigorously proven that the self-driving (autonomous) vehicle correctly implements the interpretation of the law. An implementation in a host vehicle of a SDM, illustratively, may be or include an implementation of a mathematical model for safety assurance that enables identification and performance of proper responses to dangerous situations such that self-perpetrated accidents can be avoided.

A SDM may implement logic that is applied to the SDM parameters to apply driving behavior rules such as the following five rules, for instance:

Do not hit someone from behind.
Do not cut-in recklessly.
Right-of-way is given, not taken.
Be careful of areas with limited visibility.
If you can avoid an accident without causing another one, you must do it.

It is to be noted that these rules are not limiting and not exclusive, and can be amended in various designs as desired. The rules rather represent a social driving contract that might be different depending on the region, and may also develop over time. While these five rules are currently applicable in most of the countries, they might not be complete and may be amended.

Vehicle and Accompanying Safety System

FIG. 1 shows a vehicle 100 including a safety system 200 (see also FIG. 2) in accordance with the present disclosure. The vehicle 100 and the safety system 200 are exemplary in nature, and may thus be simplified for explanatory purposes. Locations of elements and relational distances (as discussed above, the Figures are not to scale) and are provided as non-limiting instances. The safety system 200 may include various components depending on the requirements of a particular implementation and/or application.

Figure 2:
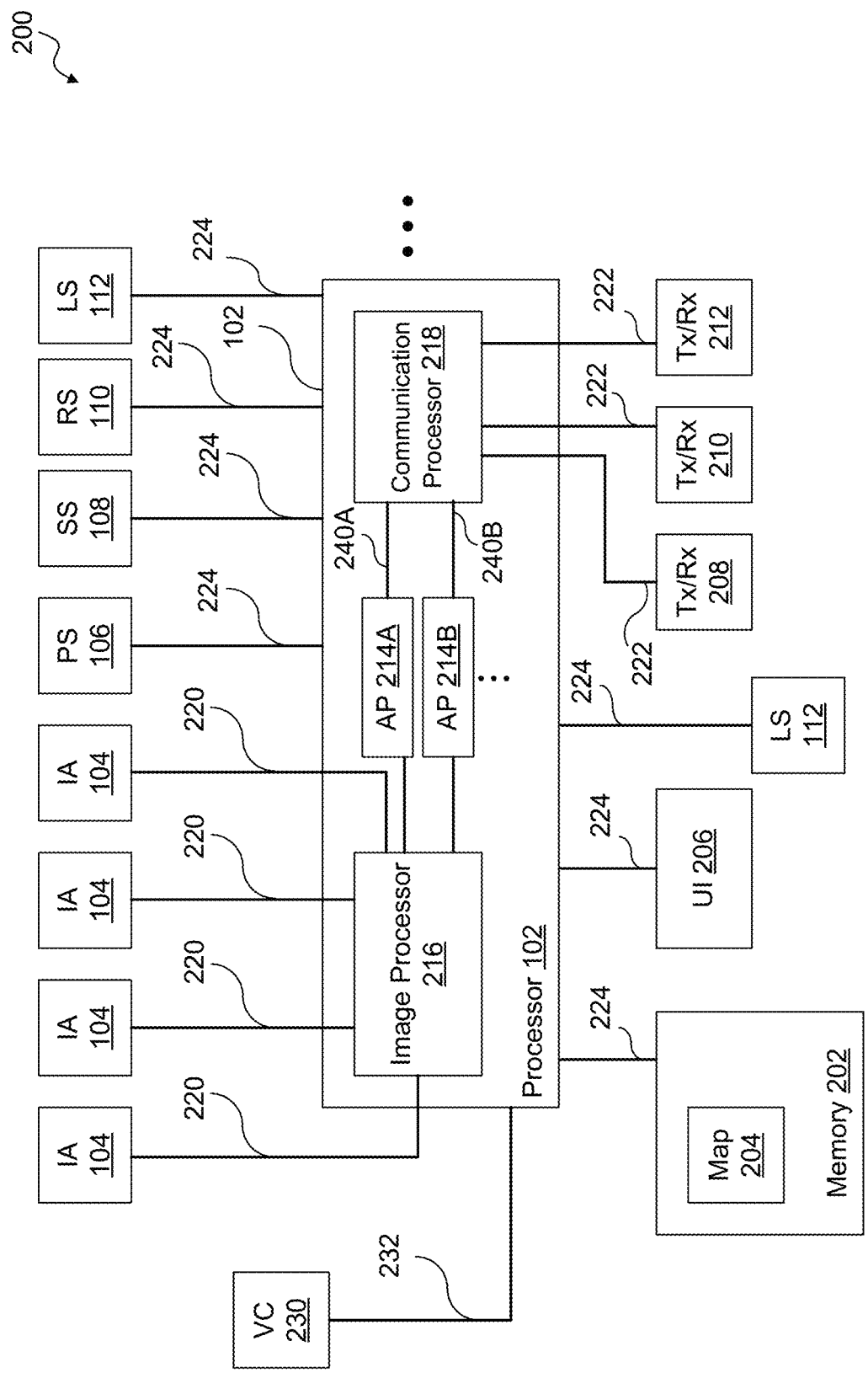
FIG. 2 illustrates various electronic components of a safety system of a vehicle in accordance with the present disclosure.

As shown in FIG. 1 and FIG. 2, the safety system 200 may include one or more processors 102, one or more image acquisition devices 104 such as one or more cameras, one or more position sensors 106 such as a Global Navigation Satellite System (GNSS), a Global Positioning System (GPS), one or more memories 202, one or more map databases 204, one or more user interfaces 206 (such as a display, a touch screen, a microphone, a loudspeaker, one or more buttons and/or switches, and the like), and one or more wireless transceivers 208, 210, 212.

The wireless transceivers 208, 210, 212 may be configured to operate in accordance with any suitable number and/or type of desired radio communication protocols or standards. A wireless transceiver (a first wireless transceiver 208) may be configured in accordance with a Short Range mobile radio communication standard such as Bluetooth, Zigbee, and the like. A wireless transceiver (a second wireless transceiver 210) may be configured in accordance with a Medium or Wide Range mobile radio communication standard such as a 3G (Universal Mobile Telecommunications System—UMTS), a 4G (Long Term Evolution—LTE), or a 5G mobile radio communication standard in accordance with corresponding 3GPP (3rd Generation Partnership Project) standards, the most recent version at the time of this writing being the 3GPP Release 16 (2020).

A wireless transceiver (a third wireless transceiver 212) may be configured in accordance with a Wireless Local Area Network communication protocol or standard such as in accordance with IEEE 802.11 Working Group Standards, the most recent version at the time of this writing being IEEE Std 802.11™-2020, published Feb. 26, 2021 (such as 802.11, 802.11a, 802.11b, 802.11g, 802.11n, 802.11p, 802.11-12, 802.11ac, 802.11ad, 802.11ah, 802.11ax, 802.11ay, and the like). The one or more wireless transceivers 208, 210, 212 may be configured to transmit signals via an antenna system (not shown) using an air interface. One or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and any other suitable communication protocols.

The one or more processors 102 may implement any suitable type of processing circuitry and architecture, and may be configured as a controller implemented by the vehicle 100 to perform various vehicle control functions. The one or more processors 102 may be configured to function as a controller for the vehicle 100 to analyze sensor data and received communications, to calculate specific actions for the vehicle 100 to execute, and to cause the corresponding action to be executed, which may be in accordance with an AV or ADAS system, for instance.

The one or more processors 102 may include one or more application processors 214A, 214B, an image processor 216, a communication processor 218, and additionally or alternatively may include any other suitable processing device not shown in the Figures. Similarly, image acquisition devices 104 may include any suitable number of image acquisition devices and components depending on the requirements of a particular application. Image acquisition devices 104 may include one or more image capture devices (such as cameras, charge coupling devices (CCDs), or any other type of image sensor). The safety system 200 may also include a data interface communicatively connecting the one or more processors 102 to the one or more image acquisition devices 104. A first data interface may include any wired and/or wireless first link 220, or first links 220 for transmitting image data acquired by the one or more image acquisition devices 104 to the one or more processors 102, such as to the image processor 216.

The wireless transceivers 208, 210, 212 may be coupled to the one or more processors 102, such as to the communication processor 218 via a second data interface. The second data interface may include any wired and/or wireless second link 222 or second links 222 for transmitting radio transmitted data acquired by wireless transceivers 208, 210, 212 to the one or more processors 102, such as to the communication processor 218. Such transmissions may also include communications (one-way or two-way) between the vehicle 100 and one or more other (target) vehicles in an environment of the vehicle 100 (such as to facilitate coordination of navigation of the vehicle 100 in view of or together with other (target) vehicles in the environment of the vehicle 100), or even a broadcast transmission to unspecified recipients in a vicinity of the transmitting vehicle 100. These communications may include messages and/or control messages that are transmitted between the vehicles while traveling together.

The memories 202 as well as the one or more user interfaces 206 may be coupled to each of the one or more processors 102, via a third data interface. The third data interface may include any wired and/or wireless third link 224 or third links 224. Furthermore, the position sensor 106 may be coupled to each of the one or more processors 102, via the third data interface.

Each processor 214A, 214B, 216, 218 of the one or more processors 102 may be implemented as any suitable number and/or type of hardware-based processing devices (processing circuitry), and may collectively, i.e. with the one or more processors 102, form one or more type of controllers as discussed herein. The architecture shown in FIG. 2 is provided for ease of explanation, and the vehicle 100 may include any suitable number of the one or more processors 102, each of which may be similarly configured to utilize data received via the various interfaces and perform a specific task.

The one or more processors 102 may form a driver scoring controller that is configured to perform road quality determinations as discussed further herein, such as the determination of road quality based on sensor data, map markers, etc., the determination of one or more road segments (including combining two or more route portions and/or dividing one or more route portions) and corresponding road segment influencing factors ("road scores), and the determination of the driver score utilizing the road segment influencing factors for their respective road segments. The functions performed by the driver scoring controller may be implements in a single processor 102 or distributed across multiple of the processors 102.

The driver scoring controller may receive data from respectively coupled components as shown in FIG. 2 via respective interfaces (220, 222, 224, 232, etc.), with the wireless transceivers 208, 210, and/or 212 providing data to the respective controller via the second links 222, which function as communication interfaces between the respective wireless transceivers 208, 210, and/or 212 and each respective controller.

The application processors 214A, 214B may individually represent respective controllers that work in conjunction with the one or more processors 102 to perform specific controller-related tasks. For instance, the application processor 214A may be implemented as a driver scoring controller, whereas the application processor 214B may be implemented as a different type of controller that is configured to perform other types of tasks as discussed further herein. The one or more processors 102 may receive data from respectively coupled components as shown in FIG. 2 via the various interfaces 220, 222, 224, 232, etc., and the communication processor 218 may provide communication data received from other vehicles (or to be transmitted to other vehicles) to each controller via the respectively coupled links 240A, 240B, which function as communication interfaces between the respective application processors 214A, 214B and the communication processors 218.

The one or more processors 102 may additionally be implemented to communicate with any other suitable components of the vehicle 100 to determine a state of the vehicle while driving or at any other suitable time. For instance, the vehicle 100 may include one or more vehicle computers, sensors, ECUs, interfaces, etc., which may collectively be referred to as vehicle components 230 as shown in FIG. 2. The one or more processors 102 are configured to communicate with the vehicle components 230 via an additional data interface 232, which may represent any suitable type of links and operate in accordance with any suitable communication protocol (such as CAN bus communications). Using the data received via the data interface 232, the one or more processors 102 may determine any suitable type of vehicle status information (vehicle data) such as the current drive gear, current engine speed, acceleration capabilities of the vehicle 100, etc.

In any event, the one or more processors may include any suitable number of other processors 214A, 214B, 216, 218, each of which may comprise a sub-processor and/or include a microprocessor, pre-processors (such as an image pre-processor), graphics processors, a central processing unit (CPU), support circuits, digital signal processors, integrated circuits, memory, or any other types of devices suitable for running applications and for data processing (image processing, audio processing, etc.) and analysis and/or to enable vehicle control to be functionally realized. Each processor 214A, 214B, 216, 218 may include any suitable type of single or multi-core processor, mobile device microcontroller, central processing unit, etc. These processor types may each include multiple processing units with local memory and instruction sets. Such processors may include video inputs for receiving image data from multiple image sensors, and may also include video out capabilities.

Any of the processors 214A, 214B, 216, 218 disclosed herein may be configured to perform certain functions in accordance with program instructions, which may be stored in a memory of the one or more memories 202. In other words, a memory of the one or more memories 202 may store software that, when executed by a processor (by the one or more processors 102, one or more of the processors 214A, 214B, 216, 218, etc.), controls the operation of the safety system 200. A memory of the one or more memories 202 may store one or more databases and image processing software, as well as a trained system, such as a neural network, or a deep neural network. The one or more memories 202 may include any number of random access memories, read only memories, flash memories, disk drives, optical storage, tape storage, removable storage, or any other suitable types of storage.

The safety system 200 may further include components such as a speed sensor 108 (such as a speedometer) for measuring a speed of the vehicle 100. The safety system may also include one or more accelerometers (either single axis or multiaxis) (not shown) for measuring accelerations of the vehicle 100 along one or more axes. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), digital compasses, and the like. The radar sensors 110 and/or the LIDAR sensors 112 may be configured to provide pre-processed sensor data, such as radar target lists or LIDAR target lists. The third data interface (one or more links 224) may couple the speed sensor 108, the one or more radar sensors 110, and the one or more LIDAR sensors 112 to at least one of the one or more processors 102.

The one or more memories 202 may store data in a database or in any different format, which may indicate a location of known landmarks. The one or more processors 102 may process sensory information (such as images, radar signals, depth information from LIDAR or stereo processing of two or more images) of the environment of the vehicle 100 together with position information, such as a GPS coordinate, a vehicle's ego-motion, etc., to determine a current location and/or orientation of the vehicle 100 relative to the known landmarks and refine the determination of the vehicle's location. Certain designs of this technology may be included in a localization technology such as a mapping and routing model.

The map database 204 may include any suitable type of database storing (digital) map data for the vehicle 100, for the safety system 200. The map database 204 may include data relating to the position, in a reference coordinate system, of various items, including roads, water features, geographic features, businesses, points of interest, restaurants, gas stations, etc, as well as parameters of such items, such as road width, grade, slope, elevation, or the like. The map database 204 may store not only the locations of such items, but also descriptors relating to those items, including names associated with any of the stored features. A processor of the one or more processors 102 may download information from the map database 204 over a wired or wireless data connection to a communication network (such as over a cellular network and/or the Internet, etc.). In some cases, the map database 204 may store a sparse data model including polynomial representations of certain road features (such as lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers. The map database 204 can also include non-semantic features including point clouds of certain objects or features in the environment, and feature point and descriptors. The map database 204 may also include road/infrastructure condition and/or quality data, road quality issue instances, such as identified or potential hazardous instances (e.g. potholes; impaired, stopped, or crashed vehicles; debris in the roadway; construction events; weather impairments (flooding, mudslide, washed-out road), or other obstructions or hazards as would be understood by one of ordinary skill in the art. The map database 204 may be dynamically updated (e.g. by the database provider, vehicle manufacture, or the like) to include changes to the map data. In some instances, the map database 204 is updated in response to driver submissions of new map data and/or driver submitted revisions to existing map data.

Furthermore, the safety system 200 may implement the aforementioned SDM as part of any suitable type of control system, which may form part of an advanced driving assistance system (ADAS) or a driving assistance and automated driving system. The safety system 200 may include a computer implementation of a formal model such as the SDM. As described above, the vehicle 100 may include the safety system 200 as also described with reference to FIG. 2. The vehicle 100 may include the one or more processors 102, which may be integrated with or separate from an engine control unit (ECU) of the vehicle 100. The safety system 200 may generate data to control or assist to control the ECU and/or other components of the vehicle 100 to directly or indirectly control the driving of the vehicle 100.

General Operation of the Vehicle 100 and Driver Scoring Controller 300

Figure 3:
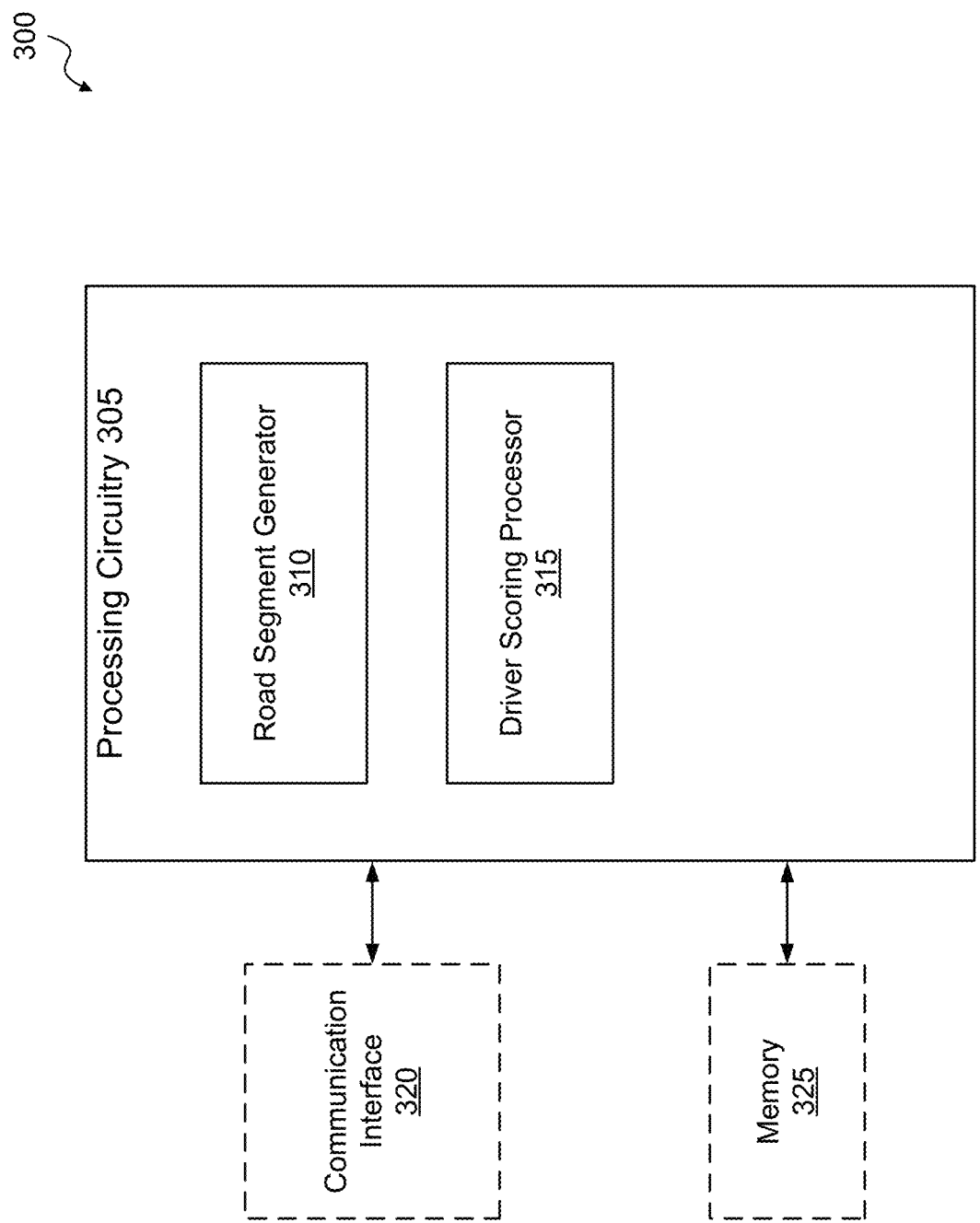
FIG. 3 illustrates a driver scoring controller in accordance with the present disclosure.

A driver scoring controller 300 of a vehicle is provided. With reference to FIG. 3, the controller 300 may include processing circuitry 305. The controller 300 may optionally include a communication interface 320 and/or memory 325. The operation of the controller 300 is further illustrated in FIG. 8.

Figure 8:
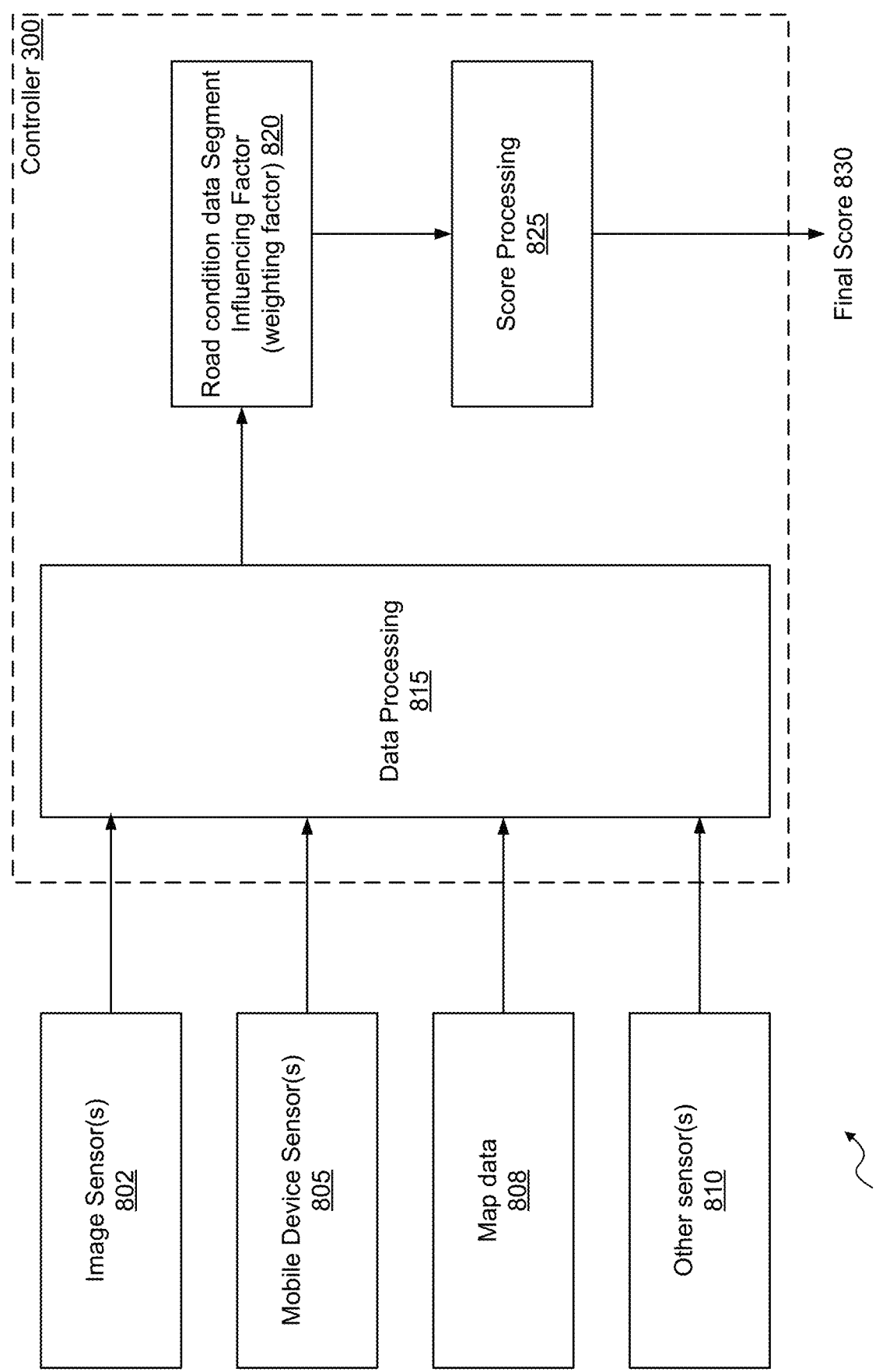
FIG. 8 illustrates a process flow to generate a driver score in accordance with the present disclosure.

The controller 300 (e.g. via communication interface 320) is configured to receive map data from map database 204 (FIG. 2) and/or from one or more external sources outside the vehicle using one or more communication protocols (e.g. 5G, vehicle-to-everything (V2X) communication protocol). For example, as shown in FIG. 8, the controller 300 may receive data from one or more image sensors 802, data from one or more mobile device sensors 805, map data 808, and/or other sensor(s) 810.

The memory 325 may store map data, road condition data, event data, driver score data, sensor data, and/or other data as would be understood by one of ordinary skill in the art. The memory 325 may additionally or alternatively store instructions that when executed by the processing circuitry 305, cause the processing circuitry 305 to perform one or more functions of the controller 300.

The processing circuitry 305 is configured to process data (e.g. map data), received by the controller 300 and/or accessed from memory 325 (815 in FIG. 8), to determine road condition data corresponding to the road qualities of the road portions identified in the map data. The processing circuitry 305 may additionally or alternatively process sensor data to determine one or more event instances represented as event data (820 in FIG. 8). Based on the road condition data and/or the event data, the processing circuitry 305 is configured to determine a driver score (825 and 830 in FIG. 8). Advantageously, by using the road condition data, the driver scores determined by the processing circuitry 305 reflect contributions of the road quality on driving events affecting the driver scores. For example, the influence of a negative driving event (e.g. a harsh breaking event) on the driver score may be reduced if such breaking event was the result of a hazard (e.g. pothole) in the roadway.

The processing circuitry 305 of the controller 300 may include a road segment generator 310 and a driver scoring processor 315. According to the disclosure, the road segment generator 310 is configured to determine road segments based on the map and/or road condition data. The road segment generator 310 may also be configured to determine weighting factors for the generated road segments based on corresponding road qualities of the segments, where the road qualities are identified in the road condition data. The road segment generator 310 may then assign the weighting factors to the generated road segments based on the corresponding road qualities of the segments. The weighting factors may be referred to as road segment influencing or quality factors.

Road segments may be generated by combining two or more road portions together to form a road segment and/or by segmenting/dividing a road portion into multiple road segments. For example, the road segment generator 310 may combine two or more road portions together that have the same or similar road quality so that the resulting road segment may be assigned a weighting factor that reflects the overall quality of the resulting road segment. In this example, the road portions of the resulting road segment are assigned the same weighting factor for all driving events occurring within the particular road segment formed by the respective road portions. According to the disclosure, the contribution of poor quality road segments may be partially or completely removed from the driver score through the utilization of the weighting factors that are assigned to road segments based on the corresponding road quality identified in the road condition data. Further, in addition or in alternative to and in any combination with the optional features previously explained in this paragraph, the road segment generator 310 is configured to analyze the road segment quality issue instance distributions of the roads and assign weighting factors to segments of the road that is reflective of the road quality for the respective segments. For example, a long stretch of road without any significant quality issue instances or with a relatively constant road quality may be classified as a road segment with a single weighting factor, a short stretch of roadway that is riddled with potholes (i.e. numerous quality issue instances) may be classified as a road segment with a single low weighting factor reflecting the poor quality of road for the respective segment. Additionally, the road segment generator 310 may assign the same weighting factor to other segments of the road that have similar road quality reflected by the number of quality issue instances. Further, in addition or in alternative to and in any combination with the optional features previously explained in this paragraph, the road segment generator 310 is configured to dynamically update the weight factors assigned to the corresponding segments and/or to adjust the lengths of the particular segments in respond to changes in the road quality for the road segments.

The determination weighting factors and road segments, and the assignment of weighting factors to particular road segments is further described with reference to FIGS. 4-7.

Figure 4:
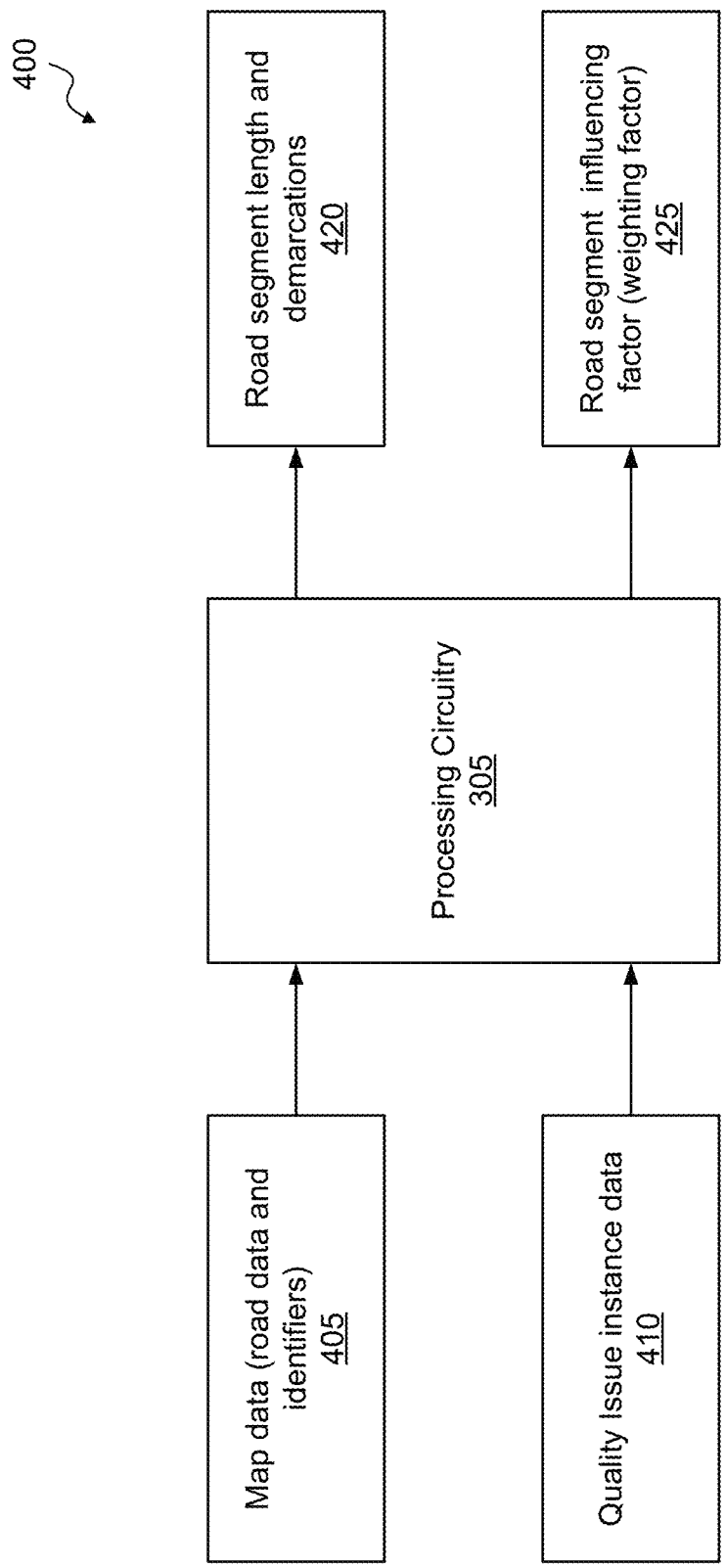
FIG. 4 illustrates a process flow to process road condition data in accordance with the present disclosure.

With reference to FIG. 4, the processing circuitry 305 (e.g. the road segment generator 310) may be configured to process the road condition data, which may include map data 405 and quality issue instance data 410. The map data 405 may include mappings of roadways, road parameters (e.g. width, length, grade, slope, etc.), landmarks, structures, or the like. The quality issue instance data 410 includes instances of quality issues (e.g. potholes, etc.) that have been identified in the roadway and the corresponding locations within the roadway for the identified quality issues. Based on the map data 405 and quality issue instance data 410, the processing circuitry 305 determines the road segments, including the segments lengths and demarcations 420, as well as the corresponding road segment influencing factors (weighting factors) 425 for the determined road segments. The processing circuitry 305 may be configured to identify road segments based on the road identifiers and structures of the map data 405 and/or use pre-identified road segments. The processing circuitry 305 may split or combine portions of the roadway (or previously determined or provided segments) to generate segments with different or similar road qualities. The weighting factors are then assigned based on the quality issue instances, including based on the density of the quality issue instances. The processing circuitry 305 may update (e.g. periodically) the weighting factors 425 to account for changes in the quality issue instance data 410, and/or may detect changes in the quality issue instance data 410 and then update the weighting factors 425 in response to the detected changes.

The processing circuitry 305 may be configured to use one or more statistical methods and/or machine learning (e.g. graph-based machine learning analysis methods) on the road quality issue instance data to determine the relative quality transitions along road lengths and to determine a length of road with similar quality as to generate a road segment to which a single weighting factor may be applied. The application of weighting factors to road segments is illustrated in FIGS. 6 and 7 and discussed in more detail below.

Figure 5A:
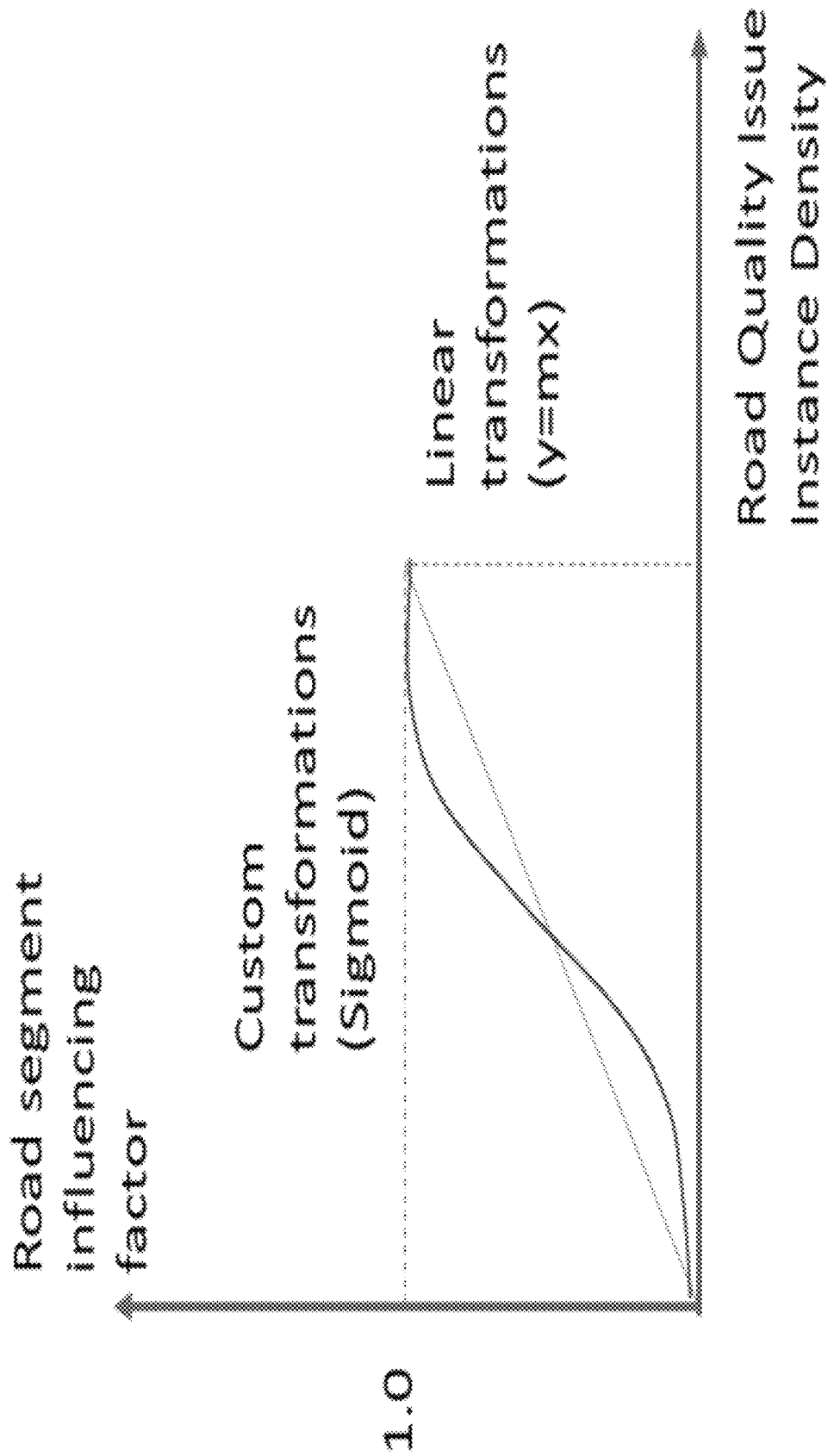
FIG. 5A illustrates an example mapping of positive contributing road quality issue densities to the road segment influencing factor/weight values in accordance with the present disclosure.
Figure 5B:
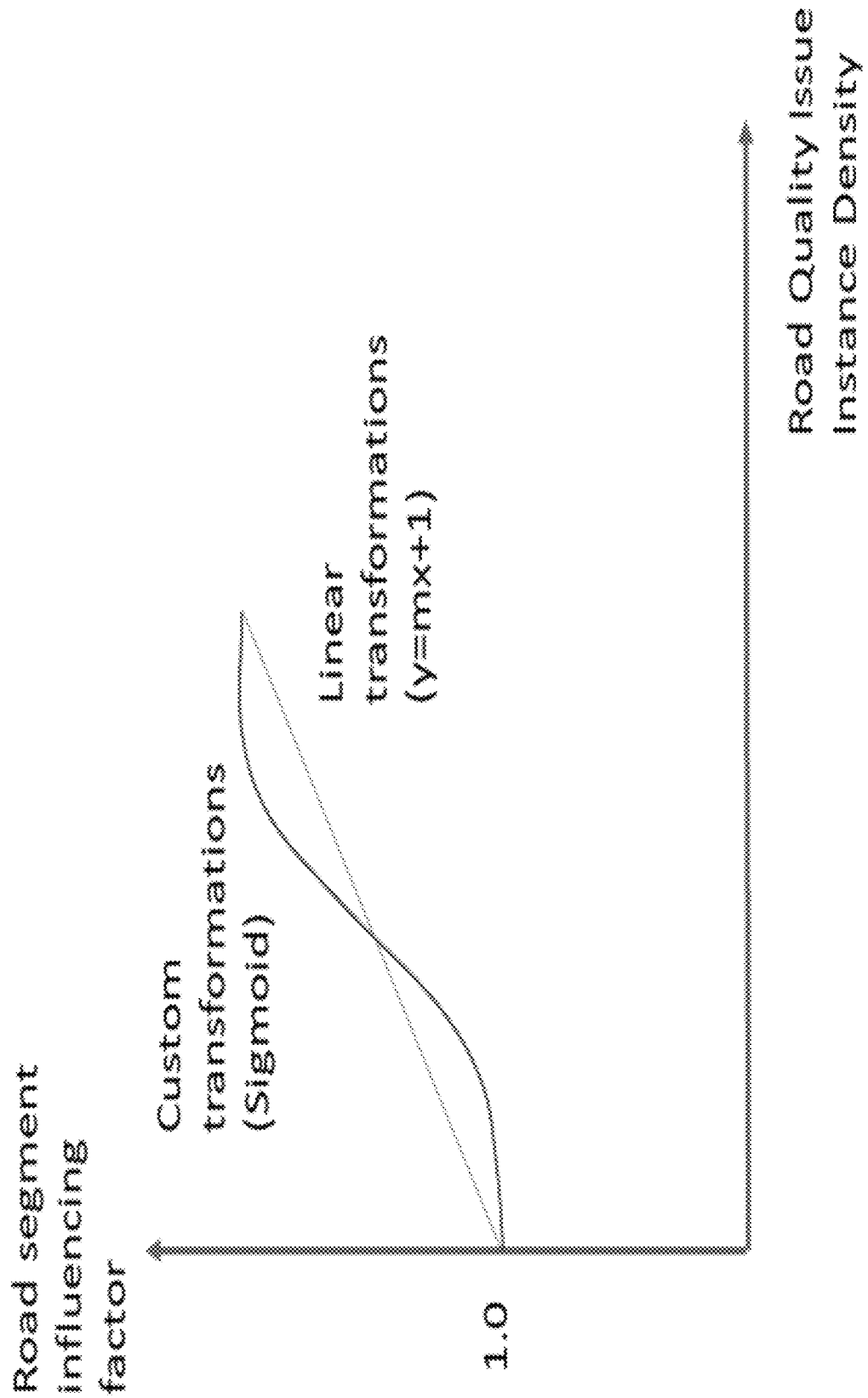
FIG. 5B illustrates an example mapping of negative contributing road quality issue densities to the road segment influencing factor/weight values in accordance with the present disclosure.

Driving events may be classified into two categories: (1) Positive contributors and (2) negative contributors. Positive contributors are those events in which weighting factors of less than 1.0 are assigned to occurrences (issue instances) in a road segment. Weighting factors having a value of less than 1.0 positively affect the driver score as the final event score is inverted and then combined with other event scores to compute the overall driver score. For example, harsh breaking (HB) and harsh curve (HC) events may be considered positive events in the presence of a hazard as drivers that generate HB or HC in the presence of a road quality instance should not be penalized for it. FIG. 5A illustrates an example mapping of positive contributing road quality issue densities to the road segment influencing factor/weight values. Negative contributors are those events in which weighting factors of greater than 1.0 are assigned to occurrences (issue instances) in a road segment. Weighting factors having a value of greater than 1.0 negatively affects the driver score as the final event score is inverted and then combined with other event scores to compute the overall driver score. For example, harsh acceleration (HA) is a negative event as drivers that generate HA in the presence of a road quality instance are to be penalized for it. FIG. 5B illustrates an example mapping of these negative contributing road quality issue densities to the road segment influencing factor/weight values.

Figure 6A:
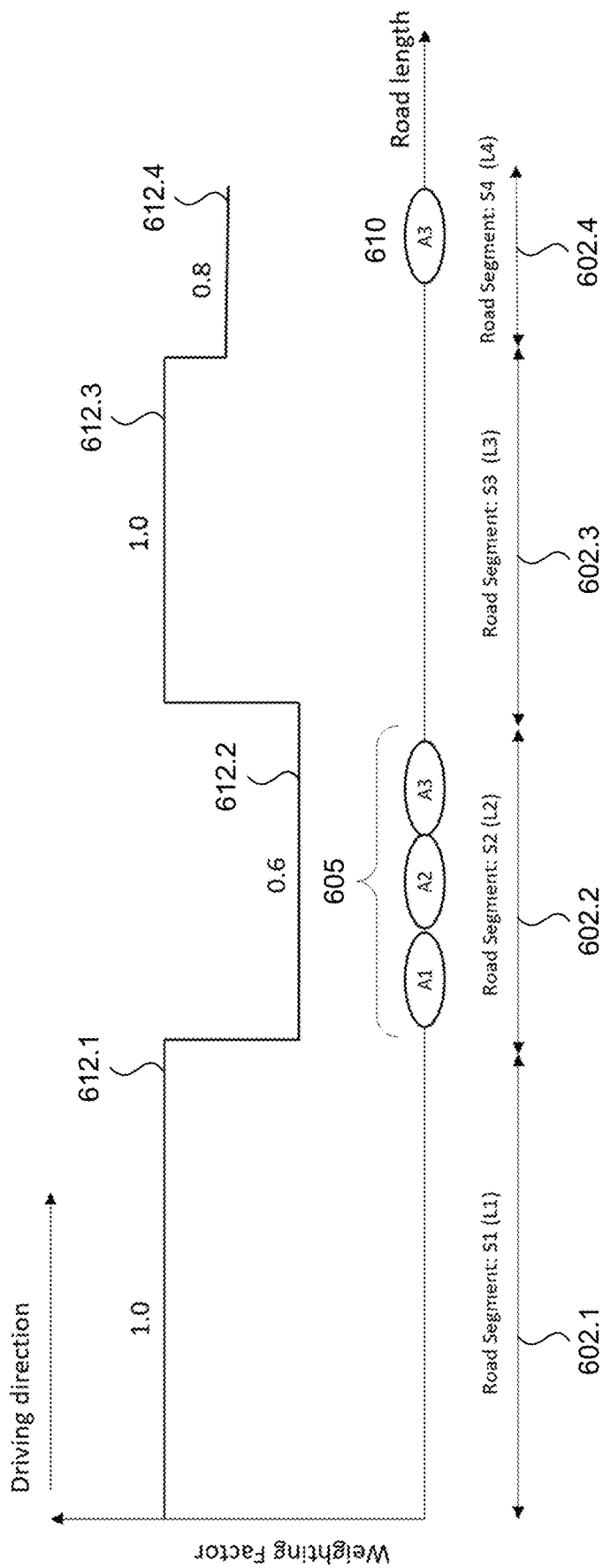
FIGS. 6A-6B illustrate the generation of road segments and corresponding weighting of the segments in accordance with the present disclosure.
Figure 7:
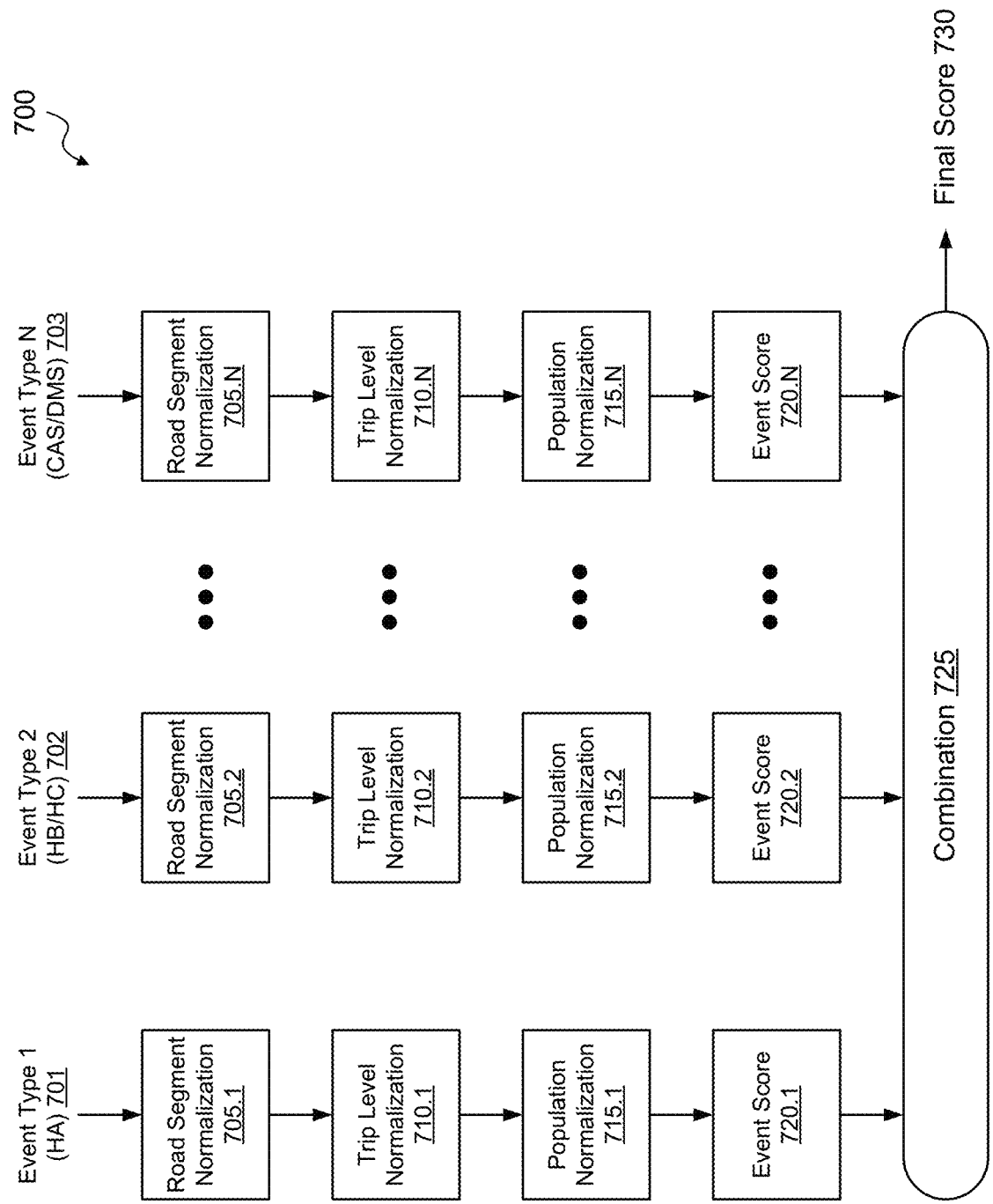
FIG. 7 illustrates a process flow to generate a driver score in accordance with the present disclosure.

FIG. 6A illustrates the generation of road segments 602 of different lengths with associated weighting factors 612 for driving events that have been classified as positive contributors. The segments 602 include Harsh Breaking (HB) driving events 605 in segment 602.2 and HB driving event 610 in segment 602.4. The road segments 602.1 and 602.3 with lengths L1 and L3 respectively have a weighting factor of 1.0, which reflects the overall good quality of the roadway in those segments. Segments 602.2 and 602.4 contain quality instances (e.g. potholes) 605 and 610, respectively. Therefore, segments 602.2 and 602.4 are assigned lower weighting factors because a HB event in these segments is likely in response to the quality instances and evidence of a more careful and attentive driver. With the weighting factors of less than 1.0, the HB events will contribute positively to the driver score.

Figure 6B:
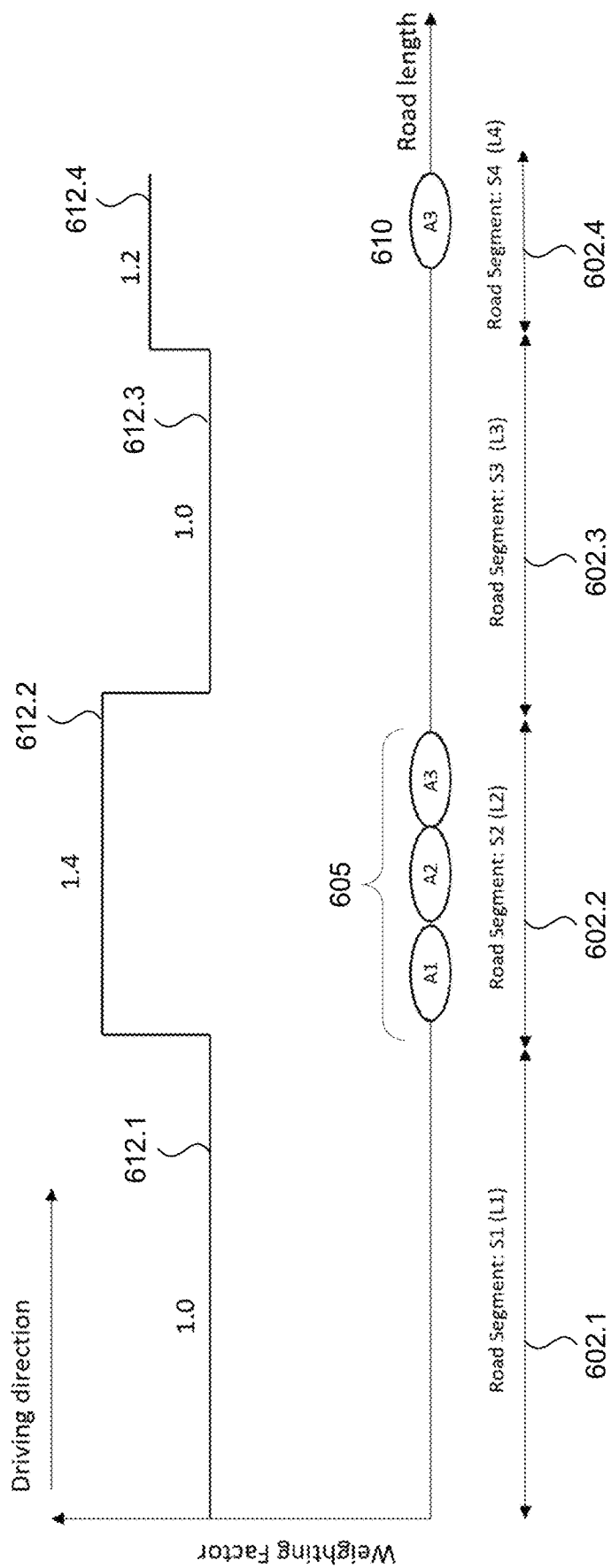

FIG. 6B illustrates the road segments 602 as shown in FIG. 6A, but are assigned weight factors for negative contributing driving events (e.g. Harsh Acceleration driving event in the present of quality instances). The road segments 602.1 and 602.3 with lengths L1 and L3 again have a weighting factor of 1.0, which reflects the overall good quality of the roadway in those segments. Segments 602.2 and 602.4 contain quality instances (e.g. potholes) 605 and 610, respectively. Therefore, segments 602.2 and 602.4 are assigned higher weighting factors rather than the lower values as in FIG. 6A. In this example, the higher weighting factors (e.g. 1.4, 1.2) contribute negatively to the driver score for the negative contributing driving events occurring in these segments because harshly accelerating through a hazard (e.g. pothole) is likely to be perceived as poor driving.

FIG. 7 illustrates a flowchart 700 of a driver score computation according to the disclosure. For the computation, the events normalized with respect to the road segments 705, current trip 710, and the driver population 715 to arrive at individual scores per type of event 720. The event scores for a given driver are then combined (725) to form the driver score 730. These operations may be performed by the processing circuitry 305, and more particularly, the road segment generator 310 and the driver score processor 315.

The determination of the driver score is based on one or more event types, such as Harsh Acceleration (HA), Harsh Velocity (HV), Harsh Breaking (HB), Harsh Curving (HC), Driver Monitoring Systems (DMS) events, Collision Avoidance System (CAS), or other events as would be understood by one of ordinary skill in the art. As shown in FIG. 7, the flowchart includes HA events 701, HB/HC events 702, and CAS/DMS events 703, but is not limited thereto and can include additional or alternative events as would be understood by those of ordinary skill. Further, the computation may include fewer or more event types than those illustrated.

For each of the event types 701, 702, 703, a road segment normalization 705 is performed. For example, after the generation of the road segments and the association of weighting factors (e.g. by the road segment generator 310), a trip score is determined using the weighting factors for all road segments that make up the current trip. The driving event instances are normalized (at 705) with the weighting factors for each road segment that form part of the trip.

The road segment normalization 705 is followed by trip level normalization 710, where normalization for the duration of the trip (e.g. per km or mile) is performed (e.g. by the driver scoring processor 315). This is followed by a population normalization 715 within the driver population to arrive at relative event scores 720 between drivers (e.g. by the driver scoring processor 315). The event scores 720 for a given driver are then combined (at 725) to form the driver score 730 (e.g. by the driver scoring processor 315).

With reference to FIGS. 4, 7, and 8, the flowcharts 400, 700, and 800 may be a computer-implemented method executed by and/or otherwise associated with one or more processors (processing circuitry) and/or storage devices. These processors and/or storage devices may be, for instance, associated with one or more components of a vehicle 100 as discussed herein with reference to FIG. 1, including the controller 300 of FIG. 3. For instance, the processors and/or storage devices may be identified with the one or more processors 102 and/or one or more of the application processors 214A, 214B, image processor 216, communication processor 216, etc., executing computer-readable instructions stored in the memory 202, as shown and described herein with reference to FIG. 2. The one or more processors 102 and/or one or more of the application processors 214A, 214B, image processor 216, communication processor 216, etc. may additionally or alternatively work exclusively as hardware components (processing circuitry or other suitable circuitry), execute instructions stored on other computer-readable storage mediums not shown in the Figures (which may be locally-stored instructions as part of the processing circuitries themselves), and any combination thereof. The various vehicle components used to perform the method 700 may also include other components such as one or more of the wireless transceivers 208, 210, 212, and their accompanying communication interface(s), as discussed herein with reference to FIG. 2. The flowcharts 400, 700, and 800 may include alternate or additional steps that are not shown in FIGS. 4, 7, and 8 for purposes of brevity, and may be performed in a different order than the steps shown.

EXAMPLES

The following examples pertain to various techniques of the present disclosure.

An example (e.g. example 1) relates to a controller of a vehicle, comprising: a communication interface configured to receive map data; and processing circuitry configured to: determine road condition data based on the map data; and determine a driver score based on the determined road condition data.

Another example (e.g. example 2) relates to a previously-described example (e.g. example 1), wherein the processing circuitry is further configured to determine a driving event, the driver score being determined based on the road condition data and the driving event.

Another example (e.g. example 3) relates to a previously-described example (e.g. example 2), wherein an impact of the driving event on the driver score is adjusted based on the road condition data.

Another example (e.g. example 4) relates to a previously-described example (e.g. example 2), wherein the driving event comprises an acceleration event, a velocity event, a braking event, a directional-change event, a distracted-driver event, impaired-driver event, and/or a collision-avoidance event.

Another example (e.g. example 5) relates to a previously-described example (e.g. example 2), wherein the driving event is determined based on data from a sensor of the vehicle and/or a sensor within or attached to the vehicle that is communicatively coupled to the controller.

Another example (e.g. example 6) relates to a previously-described example (e.g. example 2), wherein the driving event is determined based on data from a mobile device within the vehicle.

Another example (e.g. example 7) relates to a previously-described example (e.g. one or more of examples 1-6), wherein the processing circuitry is further configured to: identify portions of a route based on the map data; based on the road condition data: combine two or more of the identified route portions to determine one or more road segments, or divide one or more of the identified route portions to determine two or more of the road segments; and assign quality weighting factors corresponding to respective road qualities of the road segments to the road segments, wherein the driver score is determined based on the quality weighting factors.

Another example (e.g. example 8) relates to a previously-described example (e.g. example 7), wherein the two or more route portions combined to form a road segment have a same road quality such that a quality weighting factor assigned to the road segment is reflective of the road quality for each of the two or more route portions forming the road segment.

Another example (e.g. example 9) relates to a previously-described example (e.g. one or more of examples 7-8), wherein the one or more of the identified route portions are divided into a plurality of road segments in response to the one or more of the identified route portions having two or more portions of different road qualities.

Another example (e.g. example 10) relates to a previously-described example (e.g. one or more of examples 7-9), wherein the processing circuitry is configured to determine the road qualities of the road segments based on the road condition data.

Another example (e.g. example 11) relates to a previously-described example (e.g. one or more of examples 7-10), wherein the quality weighting factors are assigned to the road segments based on quality issue instance densities of the road segments.

Another example (e.g. example 12) relates to a previously-described example (e.g. one or more of examples 7-11), wherein a quality issue instance density of a respective road segment corresponds to a number of quality issue instances within the road segment, the quality issues instances within the road segment being identified in the road condition data.

Another example (e.g. example 13) relates to a previously-described example (e.g. one or more of examples 7-12), wherein the quality weighting factors are based on respective types of roads of the of the road segments.

Another example (e.g. example 14) relates to a previously-described example (e.g. one or more of examples 7-13), wherein the quality weighting factors are based on a driving event type of one or more driving event within the road segments, the quality weighting factors reflecting a positive or negative contribution, based on the driving event type, to the driver score.

Another example (e.g. example 15) relates to a previously-described example (e.g. one or more of examples 1-14), wherein the processing circuitry is further configured to: determine road segments of a route based on the map data; and weight the road segments based on road condition data to determine respective weighted road segments, wherein the driver score is determined based on the weighted road segments.

Another example (e.g. example 16) relates to a previously-described example (e.g. example 15), wherein determining the road segments comprises: combining two or more portions of the route to determine one of the road segments; and segment a portion of the route to determine two or more of the road segments.

An example (e.g. example 17) relates to a controller of a vehicle, comprising: a memory configured to store computer-readable instructions; and processing circuitry configured to execute the computer-readable instructions stored in the memory to: determine road condition data based on map data; and determine a driver score based on the determined road condition data and driving event data.

Another example (e.g. example 18) relates to a previously-described example (e.g. example 17), wherein processing circuitry is further configured to weight the driving event based on a weighting factor, the weighting factor being based on the road condition data.

Another example (e.g. example 19) relates to a previously-described example (e.g. example 18), wherein the weighting factor is further based on a driving event type of the driving event.

Another example (e.g. example 20) relates to a previously-described example (e.g. one or more of examples 18-19), wherein the weighting factor is configured to reflect a positive or negative contribution of the driving event, based on the driving event type, to the driver score.

An example (e.g. example 21) relates to a controller of a vehicle, comprising: interface means for receiving map data; and processing means for: determining road condition data based on the map data; and determining a driver score based on the determined road condition data.

Another example (e.g. example 22) relates to a previously-described example (e.g. example 21), wherein the processing means is configured to determine a driving event, the driver score being determined based on the road condition data and the driving event.

Another example (e.g. example 23) relates to a previously-described example (e.g. example 22), wherein an impact of the driving event on the driver score is adjusted based on the road condition data.

Another example (e.g. example 24) relates to a previously-described example (e.g. one or more of examples 21-23), wherein the processing means is configured to: determine road segments of a route based on the map data; and weight the road segments based on road condition data to determine respective weighted road segments, wherein the driver score is determined based on the weighted road segments.

Another example (e.g. example 25) relates to a previously-described example (e.g. example 24), wherein determining the road segments comprises: combining two or more portions of the route to determine one of the road segments; and segment a portion of the route to determine two or more of the road segments.

An example (e.g. example 26) relates to vehicle that includes the controller of a previously-described example (e.g. one or more of examples 1-25).

An example (e.g. example 27) relates to an apparatus as shown and described.

An example (e.g. example 28) relates a method as shown and described.

Conclusion

The aforementioned description will so fully reveal the general nature of the implementation of the disclosure that others can, by applying knowledge within the skill of the art, readily modify and/or adapt for various applications such specific implementations without undue experimentation and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Each implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The exemplary implementations described herein are provided for illustrative purposes, and are not limiting. Other implementations are possible, and modifications may be made to the exemplary implementations. Therefore, the specification is not meant to limit the disclosure. Rather, the scope of the disclosure is defined only in accordance with the following claims and their equivalents.

The designs of the disclosure may be implemented in hardware (e.g., circuits), firmware, software, or any combination thereof. Designs may also be implemented as instructions stored on a machine-readable medium, which may be read and executed by one or more processors. A machine-readable medium may include any mechanism for storing or transmitting information in a form readable by a machine (e.g., a computing device). A machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group consisting of the elements. The phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned data types and may take various forms and represent any information as understood in the art.

The terms "processor" or "controller" as used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

In one or more of the implementations described herein, processing circuitry can include memory that stores data and/or instructions. The memory can be any well-known volatile and/or non-volatile memory, including read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). A processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. A vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like.

The term "autonomous vehicle" may describe a vehicle that implements all or substantially all navigational changes, at least during some (significant) part (spatial or temporal, e.g., in certain areas, or when ambient conditions are fair, or on highways, or above or below a certain speed) of some drives. Sometimes an "autonomous vehicle" is distinguished from a "partially autonomous vehicle" or a "semi-autonomous vehicle" to indicate that the vehicle is capable of implementing some (but not all) navigational changes, possibly at certain times, under certain conditions, or in certain areas. A navigational change may describe or include a change in one or more of steering, braking, or acceleration/deceleration of the vehicle. A vehicle may be described as autonomous even in case the vehicle is not fully automatic (fully operational with driver or without driver input). Autonomous vehicles may include those vehicles that can operate under driver control during certain time periods and without driver control during other time periods. Autonomous vehicles may also include vehicles that control only some implementations of vehicle navigation, such as steering (e.g., to maintain a vehicle course between vehicle lane constraints) or some steering operations under certain circumstances (but not under all circumstances), but may leave other implementations of vehicle navigation to the driver (e.g., braking or braking under certain circumstances). Autonomous vehicles may also include vehicles that share the control of one or more implementations of vehicle navigation under certain circumstances (e.g., hands-on, such as responsive to a driver input) and vehicles that control one or more implementations of vehicle navigation under certain circumstances (e.g., hands-off, such as independent of driver input). Autonomous vehicles may also include vehicles that control one or more implementations of vehicle navigation under certain circumstances, such as under certain environmental conditions (e.g., spatial areas, roadway conditions). In some implementations, autonomous vehicles may handle some or all implementations of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (as defined by the SAE in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

The systems and methods of the disclosure may utilize one or more machine learning models to perform corresponding functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may then be used during an inference phase to make predictions or decisions based on input data.

The machine learning models described herein may take any suitable form or utilize any suitable techniques. For example, any of the machine learning models may utilize supervised learning, semi-supervised learning, unsupervised learning, or reinforcement learning techniques.

In supervised learning, the model may be built using a training set of data that contains both the inputs and corresponding desired outputs. Each training instance may include one or more inputs and a desired output. Training may include iterating through training instances and using an objective function to teach the model to predict the output for new inputs. In semi-supervised learning, a portion of the inputs in the training set may be missing the desired outputs.

In unsupervised learning, the model may be built from a set of data which contains only inputs and no desired outputs. The unsupervised model may be used to find structure in the data (e.g., grouping or clustering of data points) by discovering patterns in the data. Techniques that may be implemented in an unsupervised learning model include, e.g., self-organizing maps, nearest-neighbor mapping, k-means clustering, and singular value decomposition.

Reinforcement learning models may be given positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

The systems and methods of the disclosure may utilize one or more classification models. In a classification model, the outputs may be restricted to a limited set of values (e.g., one or more classes). The classification model may output a class for an input set of one or more input values. An input set may include road condition data, event data, sensor data, such as image data, radar data, LIDAR data and the like, and/or other data as would be understood by one of ordinary skill in the art. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

One or more regression models may be used. A regression model may output a numerical value from a continuous range based on an input set of one or more values. References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

As described herein, the following terms may be used as synonyms: driving parameter set, driving model parameter set, safety layer parameter set, driver assistance, automated driving model parameter set, and/or the like (e.g., driving safety parameter set). These terms may correspond to groups of values used to implement one or more models for directing a vehicle to operate according to the manners described herein. Furthermore, throughout the present disclosure, the following terms may be used as synonyms: driving parameter, driving model parameter, safety layer parameter, driver assistance and/or automated driving model parameter, and/or the like (e.g., driving safety parameter), and may correspond to specific values within the previously described sets.

The invention claimed is:

1. A controller of a vehicle, comprising:
    a communication interface configured to receive map data; and
    processing circuitry configured to control the vehicle to navigate an environment and, while navigating the environment, to cause the vehicle to:
        determine road condition data based on the map data;
        determine road segments of a route based on the map data;
        assign quality weighting factors corresponding to respective road qualities of the road segments to the road segments of the route, the quality weighting factors being assigned based on a driving event type of one or more driving events occurring within the road segments,
    wherein the one or more driving events are determined based on data from a sensor of the vehicle and/or a sensor within or attached to the vehicle that is communicatively coupled to the controller; and
        calculate a driver score based on the determined road condition data and the quality weighting factors by assigning, to each of the one or more driving events occurring within the road segments based on the driving event type, (i) one of a set of negative quality weighting factors that are less than a predetermined quality weighting factor, which yields a negative contribution to the driver score, and (ii) one of a set of positive quality weighting factors that are greater than a predetermined quality weighting factor, which yields a positive contribution to the driver score,
    wherein the communication interface is further configured, while the vehicle is navigating the environment, to periodically receive or periodically transmit data that is used to determine the driver score.

2. The controller of claim 1, wherein an impact of the one or more driving events on the driver score is adjusted based on the road condition data.

3. The controller of claim 1, wherein the one or more driving events comprise an acceleration event, a velocity event, a braking event, a directional-change event, a distracted-driver event, impaired-driver event, and/or a collision-avoidance event.

4. The controller of claim 1, wherein the one or more driving events are determined based on data from a mobile device within the vehicle.

5. The controller of claim 1, wherein the processing circuitry is further configured to:
    identify portions of the route based on the map data;
    based on the road condition data: combine two or more of the identified route portions to determine one or more road segments, or divide one or more of the identified route portions to determine two or more of the road segments.

6. The controller of claim 5, wherein the two or more route portions combined to form a road segment have a same road quality such that a quality weighting factor assigned to the road segment is reflective of the road quality for each of the two or more route portions forming the road segment.

7. The controller of claim 5, wherein the one or more of the identified route portions are divided into a plurality of road segments in response to the one or more of the identified route portions having two or more portions of different road qualities.

8. The controller of claim 5, wherein the processing circuitry is configured to determine the road qualities of the road segments based on the road condition data.

9. The controller of claim 1, wherein the quality weighting factors are assigned to the road segments based on quality issue instance densities of the road segments.

10. The controller of claim 9, wherein a quality issue instance density of a respective road segment corresponds to a number of quality issue instances within the road segment, the quality issues instances within the road segment being identified in the road condition data.

11. The controller of claim 1, wherein the quality weighting factors are based on respective types of roads of the of the road segments.

12. The controller of claim 1, wherein determining the road segments comprises:
    combining two or more portions of the route to determine one of the road segments; and
    segmenting a portion of the route to determine two or more of the road segments.

13. The controller of claim 1, wherein the set of negative quality weighting factors are less than one, and
    wherein the set of positive quality weighting factors are greater than one.

14. The controller of claim 1, wherein the predetermined quality weighting factor is one.

15. The controller of claim 1, wherein the predetermined quality weighting factor corresponds to a predetermined road quality.

16. The controller of claim 1, wherein the processing circuitry is configured to determine the road segments of the route based on the map data by executing a machine learning model to segment the route into the road segments based upon which ones of the route segments may be assigned a single quality weighting factor.

17. The controller of claim 1, wherein the processing circuitry is configured to detect changes in the road condition data and, in response, to automatically update the assignment of the quality weighting factors to the road segments of the route.

18. A controller of a vehicle, comprising:
    a memory configured to store computer-readable instructions; and
    processing circuitry configured to execute the computer-readable instructions stored in the memory to control the vehicle to navigate an environment and, while navigating the environment, to cause the vehicle to:
        determine road condition data based on map data;
        determine road segments of a route based on the map data;
        assign quality weighting factors corresponding to respective road qualities of the road segments to the road segments of the route, the quality weighting factors being assigned based on a driving event type of one or more driving events occurring within the road segments, wherein the one or more driving events are determined based on data from a sensor of the vehicle and/or a sensor within or attached to the vehicle that is communicatively coupled to the controller;

calculate a driver score based on the determined road condition data and driving event data and the quality weighting factors by assigning, to each of the one or more driving events occurring within the road segments based on the driving event type, (i) one of a set of negative quality weighting factors that are less than a predetermined quality weighting factor, which yields a negative contribution to the driver score, and (ii) one of a set of positive quality weighting factors that are greater than a predetermined quality weighting factor, which yields a positive contribution to the driver score; and while the vehicle is navigating the environment, cause periodic receiving or periodic transmitting of data that is used to determine the driver score.

19. A controller of a vehicle, comprising:

interface means for receiving map data; and processing means for controlling the vehicle to navigate an environment and, while navigating the environment, to cause the vehicle to:

determine road condition data based on the map data;

determine road segments of a route based on the map data;

assign quality weighting factors corresponding to respective road qualities of the road segments to the road segments of the route, the quality weighting factors being assigned based on a driving event type of one or more driving events occurring within the road segments, wherein the one or more driving events are determined based on data from a sensor of the vehicle and/or a sensor within or attached to the vehicle that is communicatively coupled to the controller; and calculate a driver score based on the determined road condition data and the quality weighting factors by assigning, to each of the one or more driving events occurring within the road segments based on the driving event type, (i) one of a set of negative quality weighting factors that are less than a predetermined quality weighting factor, which yields a negative contribution to the driver score, and (ii) one of a set of positive quality weighting factors that are greater than a predetermined quality weighting factor, which yields a positive contribution to the driver score, wherein while the vehicle is navigating the environment, the interface means periodically receives or periodically transmits data that is used to determine the driver score.

20. The controller of claim 19, wherein an impact of the one or more driving events on the driver score is adjusted based on the road condition data.

21. The controller of claim 19, wherein determining the road segments comprises:

combining two or more portions of the route to determine one of the road segments; and segmenting a portion of the route to determine two or more of the road segments.

* * * * *